United States Patent
Herrmannsdörfer et al.

(10) Patent No.: US 6,294,981 B1
(45) Date of Patent: Sep. 25, 2001

(54) TRANSPONDER READING DEVICE AND ALSO CONTROL SYSTEM FOR CONTROLLING THE HANDLING OF TRANSPONDER-BEARING OBJECTS BY MEANS OF TRANSPONDER READING DEVICES

(75) Inventors: Dieter Herrmannsdörfer, Mistelgau; Harald Buchmann, Bindlach, both of (DE)

(73) Assignee: Hermos Gesellschft fur Technische Informik mbH, Mistelgau (DE)

( * ) Notice: Subject to any disclaimer, the term of this patent is extended or adjusted under 35 U.S.C. 154(b) by 0 days.

(21) Appl. No.: 09/242,245
(22) PCT Filed: Aug. 12, 1997
(86) PCT No.: PCT/EP97/04381
 § 371 Date: Dec. 16, 1999
 § 102(e) Date: Dec. 16, 1999
(87) PCT Pub. No.: WO98/07111
 PCT Pub. Date: Feb. 19, 1998

(30) Foreign Application Priority Data

Aug. 14, 1996 (DE) .............................................. 196 32 798

(51) Int. Cl.[7] .................................................. G08B 9/00
(52) U.S. Cl. .............................. 340/286.02; 340/825.58; 342/44; 342/50; 342/51
(58) Field of Search ................... 340/286.02, 825.58, 340/825.22, 825.31, 825.32, 10.33, 10.5; 342/42, 44, 51, 50; 375/329

(56) References Cited

U.S. PATENT DOCUMENTS

| | | | |
|---|---|---|---|
| 4,740,792 | * | 4/1988 | Sagey et al. ......................... 342/457 |
| 5,070,334 | * | 12/1991 | Commissaire et al. ................ 342/43 |
| 5,144,314 | * | 9/1992 | Malmberg et al. ..................... 342/44 |
| 5,621,411 | * | 4/1997 | Hagl et al. ............................. 342/42 |
| 6,081,199 | * | 6/2000 | Hogl ................................ 340/825.31 |
| 6,122,329 | * | 9/2000 | Zai et al. ............................. 375/329 |

* cited by examiner

Primary Examiner—Edward Lefkowitz
Assistant Examiner—Davetta Goins
(74) Attorney, Agent, or Firm—Scully, Scott Murphy & Presser

(57) ABSTRACT

A transponder reading device and a control system for controlling the handling and/or processing of transponder-bearing objects by such transponder reading devices. The transponder reading device is equipped with its own microcontroller, and with its own control unit. The microcontroller is, as a component (node) of a control unit, able to communicate with other devices of the same design to exchange information. Consequently, several such devices can be operated simultaneously in a confined space without interfering with each other.

6 Claims, 2 Drawing Sheets

Figure 1:
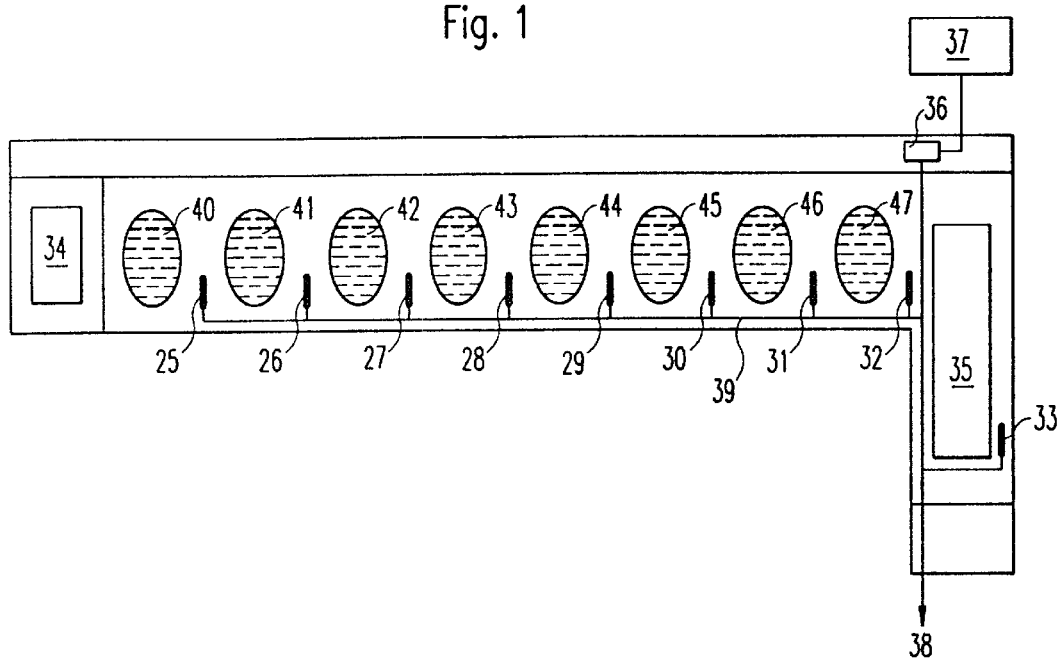

TRANSPONDER READING DEVICE AND ALSO CONTROL SYSTEM FOR CONTROLLING THE HANDLING OF TRANSPONDER-BEARING OBJECTS BY MEANS OF TRANSPONDER READING DEVICES

This invention concerns a transponder reading device and a control system for controlling the handling and/or processing of transponder-bearing objects by means of transponder reading devices of this type.

A transponder reading device comprising a device to transmit information between a transponder and the transponder reading device in the frequency shift keying method in the high frequency range is known and is marketed for example by the company Texas Instruments under the name TIRIS as a high-frequency identification system. The system essentially consists of two components, namely the transponder and the transponder reading device with aerial. The transponder which is normally minute and battery-free is obtainable as a Read-Only or a Write-Only version and can be flxed to the corresponding objects or built into them. As soon as the transponder gets into the reading range of the antenna of the transponder reading device, it receives a short pulse from the reading unit. Using the energy which it receives from this, the transponder sends back its individual answer-back code or. if it is in the Write-Read version, the information stored in it. It is also written in or back into the transponder via high frequency.

The transmission between the transponder and the transponder reading device occurs in the frequency shift keying process with frequency changes between in particular 123.2 and 134.2 kHz in half-duplex mode. This process is not susceptible to interference and can be implemented economically. This technology enables it to read and write without contact and touch, also through non-metallic materials.

The reading distance of a transponder reading device is dependent upon the type and sensitivity of the aerial and the size of the transponder and can be up to 2 meters, but on average up to approximately half a meter. The interference distance within which a transponder reading device interferes with or renders impossible the read-out of another transponder reading device is generally 1.5 meter, but can be up to 5 meters for the same reasons as in the case of the reading distance. Several transponder reading devices according to prior art which are positioned in a confined space cannot therefore be operated simultaneously, but must either be synchronised or individually triggered.

The task of this invention is therefore to make available a transponder reading device comprising a device to transmit information between a transponder and the transponder reading device in the frequency shift keying method in the high-frequency range, and a control system for controlling the handling of transponder-bearinng objects by means of transponder reading devices of this kind, in which several transponder reading devices can be operated or triggered together in a confined space.

This task is solved by a transponder reading device, with a device for transmitting between information between a transponder and the transponder reading device by a frequency shift keying process in the high frequency range, characterized by a microcontroller which is operated in a decentrally operating control network, which has a device to transmit information between a transponder and the transponder reading device in the frequency shift keying process in the high-frequency range and a micro-controller which can be operated as pant of a decentrally-operating control network.

The above task is furthermore solved by means of a control system for controlling the handling and/or processing of transponder-bearng objects by means of transponder reading devices of this kind, wherein processing stations include transponder reading devices which are jointly connected in a decentrally operating control network; wherein transponder reading devices are provided at handling and/or processing stations and are jointly connected to a control network.

Advantageous configurations of this invention are given in the respective subclaims.

The advantage of this invention lies especially in the fact that the transponder reading device according to the invention is equipped with its own micro-controller, and therefore with its own control unit. The micro-controller is, as a component ("node") of a control uiUt, able to communicate with other devices of the same or similar design, i.e. to exchange information. Consequently several such devices can be operated simultaneously in the most confined space without interfering with each other. A device which happens to want to start the identification or read-out of information from a transponder asks the other devices of the control network located in the vicinity whether these happen to be in operation or informs these devices when it itself wants to assume operation. By this means it is possible to operate several transponder reading devices simultaneously in a confined and very confined space.

In the following this invention is explained in greater detail with the aid of preferred embodiments by reference to the attached drawings, in which are shown FIG. 1 a first embodiment of this invention, FIG. 2 a second embodiment of this invention, and FIG. 3 a third embodiment of this invention.

The transponder reading device according to the invention (not shown in detail) has a switching power pack, a data transmission device to transmit information between a transponder and the transponder reading device, and an aerial. These elements are normally mounted in a housing. A transponder is generally mounted on an object or built into an object and is a passive electronic component which is charged by a power pulse and as a result of which can send back its identification number or also data to the transponder reading device. Transponder reading devices can be used for identifying operating equipment and also to identify pallets, racks, magazines, boxes, tanks and also tools or vehicles, for determining the position of floor and overhead conveyors and also for process control, internal logistics or also for monitoring movement or rotation at great distances. The aerial can either be built into the transponder reading device or also can be mounted on the housing of the reading device. The reading distance between a transponder and a transponder reading device can lie between a few centimeter and half a metre depending upon area of use. As soon as the transponder reaches the reading range of the aerial, it receives a short pulse from the transponder reading device. The transponder, which can exist as a Read-Only or a Write-Only version, sends back its individual identification code with the so-received power or, if it exists in the Write-Read version, the information stored in it. A transponder reading device can be designed in an advantageous configuration so that it can read out information from several transponders of various types.

The transmission between the transponder and the transponder reading device occurs in the frequency shift keying process with frequency changes between for example 123.2 and 134.2 LHz in half-duplex mode. However other frequencies can also be used and systems can also be used which operate with AM or in the half-duplex mode. If the transponder exists in the Write-Read version, the information contained in it is also written into the transponder via high frequency or is read from it.

The transponder reading device according to the invention is equipped with a microcontroller which can be operated as part or "node" of a decentrally-operating control network. In the rmicro-controller is provided an integrated complete communication protocol for communication with other units of the network. For preference the nucro-controller contains processing units of which one is used to process or control the application program and at least one further unit is used to process or control information exchanged inside the control network. This information can come from micro-controllers in other transponder reading devices or, for example, also from a central network manager.

In the internal memory of the micro-controller are integrated data and programs for the event-controlled operating system, the communication protocol and also a library of a number of I/O models. With this, any complicated input/output functions can be achieved in an application with the I/O pins. Netvork variables which make possible an event-controlled, prioritised and automatic transmitting and receiving of data form the basis of the communication capacity of the micro-controller with other units of the network. By means of a clear separation of node function and network functionality new nodes can be added in a simple manner or nodes can be removed without impairing the remaining network functions. The transmission of data or information between the micro-controher and the remaining units of the network can, for example, be carried out via copper cables, telephone cables, fibre-optical waveguides, spark gaps or also via the 220 V mains installation. The decentral conception of this network has the advantage that in the case of the retrofitting of options or new function components no bottlenecks arise. Furthermore, new units, parts, nodes or neurons can be added to the network without problem. The individual micro-controllers of the network are able to transmit information from point to point, and therefore also messages which are required simultaneously by several devices. Furthermore the system possesses a continuous active self-moritoring, which automatically recognises defective nodes and transmits messages accordingly.

Figure 2:
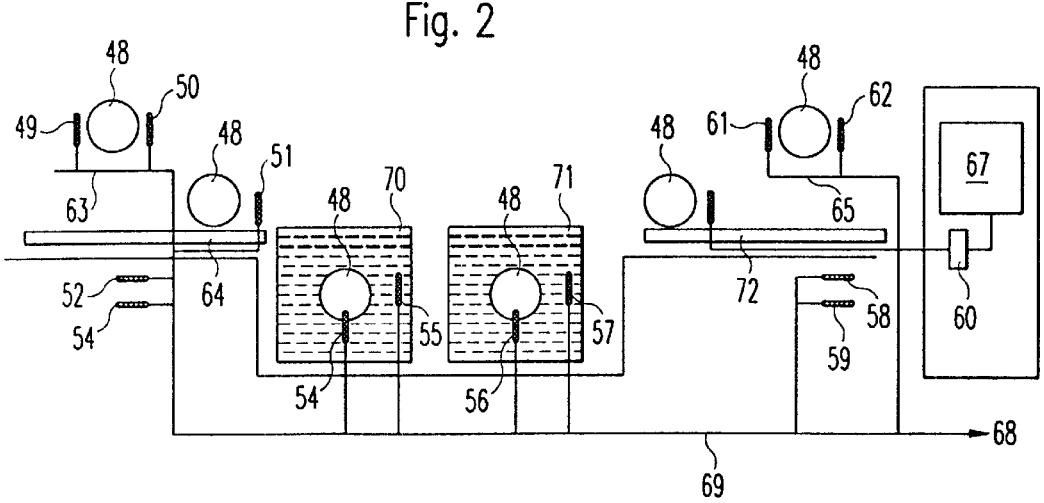
Figure 3:
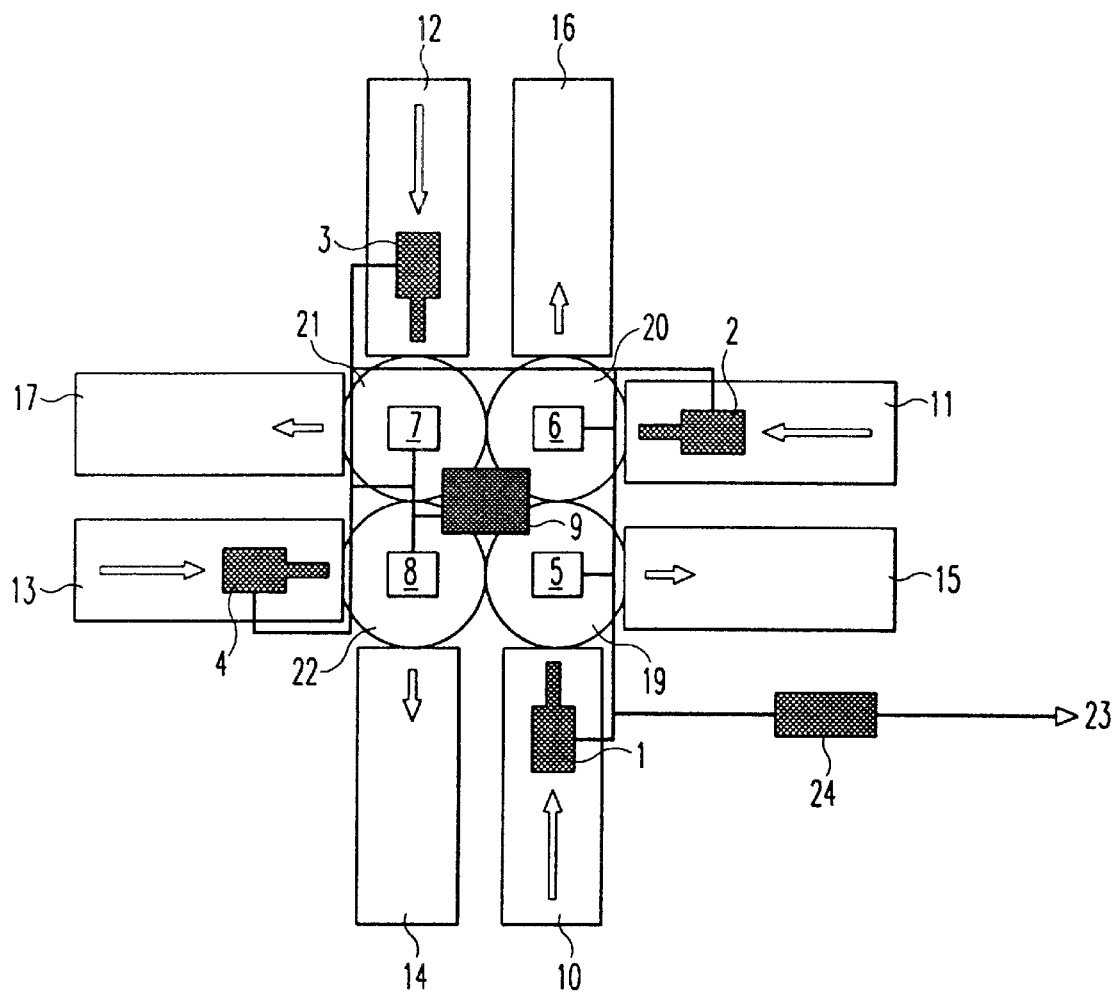

Practical possibilities of application of the transponder reading device according to the invention and the control network made possible by it are shown in FIGS. 1–3.

FIG. 1 shows a first embodiment of this invention, namely a control system for controlling the handling and/or processing of transponder bearing objects by means of transponder reading devices according to the invention. FIG. 1 shows a cleaning system, for example for silicon wafers or similar disk-shaped objects with a loading station 35, into which magazines are inserted by operating personnel. The magazines contain several silicon wafers, which are passed through the cleaning system illustrated. On each magazine is mounted a transponder which contains the identification code for each magazine. On the loading station 35 is mounted a transponder reading device 33 according to the invention which identifies the magazine and transfers the transponder identification code via a gate device 36 to a processing unit 37. If a valid magazine is recognised, then the cleaning process will commence.

The cleaning system consists of several acid, leaching and rinsing vats which are mounted one behind the other and are passed through by the magazines with the silicon wafers. On each vat or between adjacent vats are mounted transponder reading devices which monitor or control the cleaning process. If a valid magazine was recognised in the loading station by the control device 37, a check is made by a first transponder reading device 32, which is mounted next to a first leaching vat 47, whether there is already a magazine in this leaching vat 47. If not, the new niagazine from the loading station 35 is inserted into the leaching vat 47, for example by means of a gripping device. The transponder reading device 32 then checks whether the magazine was actually inserted into the vat 47.

After the leaching vat 47, the magazine is inserted into a rsing vat 46, and then into an acid vat 45. In the embodiment illustrated, the magazine also passes through a rinsing vat 44, a leaching vat 43, a rinsing vat 42, an acid vat 41 and finally a rinsing vat 40. Between the vats or on each vat are mounted transponder reading devices 31 to 25 according to the invention, by means of which a check is made before each movement of the magazine whether the next vat is free. After moving the magazine to the respective new vat, a check is made by the respective transponder reading device on the vat whether the magazine has arrived.

From the rinsing vat 40 the cleaned magazine is again removed by a gripping device and inserted into an unloading station 34 from where it is either discharged automatically or is removed by the operating personnel.

In the first embodiment illustrated in FIG. 1 it can be seen that all transponder reading devices 25 to 33, and also the gate device 36 are jointly connected by means of a common line 39 to a decentrally-operating control network. By means of the above-described embodiment of the transponder reading devices according to the invention it is possible to operate the transponder reading devices 25–35 together, in a very confined space, in the cleaning system shown. The gate device 36 is connected to a control device 37 which is used among other things to identify the transponder bearing magazine with the silicon wafers. The control system is furthermore connected via a line 38 to a magazine administration system, via which is controlled the control of the handling and processing of the magazines or the objects contained in it. The magazine administration system can be formed by a computer system which is equipped with an appropriate software which controls the cleaning system. This administration system is also used to monitor where and in what manufacturing condition the magazines or objects of each production batch are, whether all parts of each batch have taken the correct course through the cleaning system, and whether the finished batch possibly has losses of quality because the processing formula has not been complied with.

The appropriate software permlts a easily understandable structuring of the cleaning system. The processing stations and the transfer routes are consigned as a system network. The transponder reading devices form the nodes of the network. With a large number of network nodes, the system to be controlled can quickly be lost track of. In order to keep track, the software of the magazine administration system includes a hierarchically structured representation concept with which the illustrated cleaning system or any system to be controlled can be subdivided into any number of planes. Each system hierarchy plane is structured by a network. The configuration actions for the software to be performed by the user include the depositing of information about the system being controlled, the allocation of the processing or handling stations to the transponder reading device and the recording of all transponders which are carried by respective objects or magazines.

The components of the identification system, i.e. the transponders and the transponder reading device can be controlled via dialogue windows of a screen of the computer system and allocated to the model of the respective system. The formulae for the respective batch course can be input as path-target description. The inputting of the path-target description takes place by a simple flagging of the network nodes in the desired series. The allocation of how many material continers belong to a production batch and to which batch the material or the objects in any container belong must be inputted by the respective user into the computer system. He must also log the allocation of the objects to the respective containers in the case of loading, re-loading and unloading processes. The software of the administration system in this way supplies information on the run status of the respective batches and also reports, which record defects in the cycle. If there is an divergence in the specified cycle of a process, an immediate warning signal is generated in order to be able to prevent losses of quality in the preliminary stages.

In FIG. 2 a second preferred embodiment of this invention is shown. As it is in the first embodiment, the second embodiment is also a cleaning system for silicon wafers. Magazines 48 with silicon wafers are inserted either automatically or by operating personnel into a stack or batch holder 63. On the batch holder 63 are mounted two transponder reading devices 49 and 50, which determine whether the inserted magazine 48 is valid and whether the correct stack holder 63 has been mounted for the respective magazine. This information is passed to a control device 67. The magazine 48, if it is recognised as being valid, is inserted via a loading device 64 into an acid vat 70. On the loading device 64 are mounted two transnder reading devices 52 and 53 which monitor whether the loading device 64 is suitable for the magazine 48 being loaded and whether the magazine 48 is valid. Between the loading device 64 and the acid vat 70 is mounted an additional transponder reading device 51 which monitors the loading process. In the acid vat 70 a transponder reading device 55 is provided which checks whether the magazine 48 has been correctly inserted into the vat. An additional transponder reading device 54 monitors whether the magazine being cleaned is turning in the acid vat 70. If it is not turning, an error signal is transmitted to the control device 67. From the acid vat 70 the magazine 48 is reloaded into a rinsing vat 71 in which a transponder reading device 57 is mounted, 30 which checks whether the magazine 48 has arrived correctly in the vat 71. A further transponder reading device 56 monitors the rotation of the magazine 48 in the rinsing vat 71.

If the rising of the magazine and the silicon wafer contained therein is finished, the magazine 48 is removed from the linsing vat 71 by an unloading device 72. A transponder reading device 60 thereby monitors the wiloading process. Further transponder reading devices 58 and 59, which are mounted on the unloading device 72, check whether the correct unloading device 72 has been installed for the respective magazine and whether the magazine 48 is valid. The unloading device 72 transfers the magazine 48 with the cleaned silicon wafers to a stack holder 65, from which the magazine is removed and passed on automatically or by the operating personnel. On the stack holder 65 are mounted two transponder reading devices 61 and 62 which check whether the stack holder 65 is suitable for the respective magazine and whether the loaded magazine 48 is a valid miagazine.

All the transponder reading devices illustrated 49 to 62 are connected by a common data line 69 and form a decentrally operating control network. The control information is passed on from the respective transponder reading devices to a control device 67 via a gate device 60. Via a further line 68 which is connected to the control network 69, the control system illustrated is connected to a magazine adminlstration system which has already been described in detail by reference to the first embodiment. The transponders read by the transponder reading devices shown in FIG. 2 are located on the one hand on the magazine 48 which contains the silicon wafer to be cleaned, and also on the stack holders 63 and 65, on the loading device 64 and the unloading device 72. Also in the second embodiment, the transponder reading devices can be operated in the most confined space thanks to the configuration according to the invention.

FIG. 3 shows a third preferred embodiment for the control system according to the invention for controlling the movement of transponder bearing objects by means of transponder reading devices according to this invention. The control system consists of a network which has modular units 1 to 9. At one or more intersections of the transfer routes of the objects a modular units 1 to 9 is provided of the type which is used for the decentral control of the movement of the objects at the respective intersection.

In this case, the intersection consists of four tracks each arranged in pairs 10 and 14, 11 and 15, 12 and 16, 13 and 17 for incoming and outgoing objects, and also four devices 19 to 22 to change the direction of movement of the objects. In the example illustrated these devices 19 to 22 consists of rotating tables. Every rotating table 19 to 22 is each allocated to a track for incoming objects and a track for outgoing objects which belong to adjacent pairs. Therefore, for example, the rotating plate 19 is allocated to the track 10 for incoming objects and to the track 15 for outgoing objects. The modular unit serving to control the movement of incoming and outgoing objects at the intersection consist, in the example illustrated, of a transponder reading device 1 to 4 for each track 10 to 14 for incoming objects, a secondary control unit 5 to 8 for each rotating plate 19 to 22 and a main control unit 9. The four transponder reading devices 1 to 4, the four secondary control units 5 to 8 and the main control unit are jointly finked to a modular unit a-nd have a comi-mon connection 23 to the remaining units or nodes of the network. In this connection is provided a unit which allows data or information to pass which is of interest to other modular units or any network manager which might be provided.

Even fairly large handling systems can therefore be achieved by the control system according to the invention by subdividing the entire system into modular units with the same or similar functionality. By this means the entire system is easy to understand, simple to maintain and economical.

According to the example illustrated in FIG. 3 a handling system consisting of many intersections of transfer tracks can be controlled by the control system according to the invention. The number of rotating plates or pairs of transfer tracks is in this case not limited to four. In the example shown the four rotating plates 19 to 22 are controlled by the main control unit. A secondary control unit 5 to 8 is allocated to each rotating table which takes over the internal control of the respective rotating plate 19, 20, 21 or 22. In the main control unit 9 is the decision table for the destination of the objects to be moved. It looks at the rotating plate group in its entirety and trarisnts only the decision about the positioning of each individual rotating plate to this.

Before the passing over of the respective rotating plate by one or more objects the destination address is read. This information is transmitted to the main control unit 9. Then, in the main control unit 9, the respective starting direction according to the destination address is determnined. Before the passing over of the first rotating plate by the object, it is checked whether the track for carrying away the object or objects is free. It is then checked whether all the rotating plates needed for the process are ready for use and with it whether the prescribed quickest route is possible. For example in the case of a "left-hand turn" and for a 180° turn there are two possible routes through the four rotating plates. The quicker one in each case is passed through for preference. If this is not possible then the main control unit 9 selects the alternative route.

Both rotating plates involved in the process are now moved into the optimal position in order to make possible the quickest possible passage of the object or objects through the rotating plate group. If the first plate is in position, it is passed over by the objects. If it has reached its end position, the object leaves the rotating plate and passes over the next rotating plate and so on until the object has left the last rotating plate. All rotating plates signal their condition to the main control unit 9, whereupon this allows the next object or objects to set off.

In the example shown each transponder reading device 1 to 4 is mounted on or above the tracks 10 to 14 for the incoming objects. A transponder reading device can, however also be mounted above each track for the outgoing objects. Also in this case the transponder reading devices can be operated in the most confined space thanks to the configuration according to the invention.

In the following a control procedure is described by way of example for the modular unit illustrated. To begin with a transponder reading device reads the data from a transponder which is mounted on an incomitig object. Then the transponder reading device signals the content of the data to the main control unit. The main control unit 9 decides with the aid of the stored decision table in which direction the object shall leave the rotating plate group, i.e. via which of the tracks 15 to 18 for outgoing objects the incoming object shall leave the intersection. Then the main control unit 9 asks the transponder reading device mounted on the corresponding track whether the way out is free. Thereupon the main control unit 9 gives the command to the respective secondary control units of those rotating plates which will be involved in moving the object to adopt the optimal position. Thereupon the command from the main control unit 9 is effected to the track on which the object is arriving, the command to move the object to the first rotating plate. Thereupon the command is effected to the secondary control unit of the first rotating plate to turn the first rotating plate. Subsequently the object is moved over either one or several rotating plates and then moved to the track via which it is to be discharged.

The modular unit of the control system illustrated can be connected via a gate device 24 to further modular units and also to an administration system which has already been described by reference to the first two embodiments.

As a further modular unit for the control system according to the invention a modular unit can be provided for a storage device of the handled objects. This modular unit controls the storage device and the tracks feeding in or removing the objects to the storage device in a similar manner to the above example. These are monitored by a light scanner or a light barrier. The incoming object houses the optical transmitter and a read-out of the transponder is started by an appropriately mounted transponder reading device. In this case the aerial of the transponder reading device must be located sufficiently far away from the mounting site of the memory in order not to read the transponders mounted on the stored objects by mistake. The transponder reading device decides, with the aid of the destination address stored in the transponder of the incoming object, whether the object is stored or not.

What is claimed is: with a device for transmitting information between a transponder and the transponder reading device by a frequency shift keying process in the high frequency range,

1. Control system for controlling the processing of transponder bearing objects by transponder reading devices respectively comprising, a device for transmitting information between a transponder and the transponder reading device by a frequency shift keying process in the high frequency range, and a microcontroller which is operated in a decentrally operating control network, wherein processing stations include the transponder reading devices which are jointly connected in the decentrally operating control network, characterized in that a transponder reading device. upon starting identification of or read-out of information from a transponder, asks other transponder reading devices of the control network located in the vicinity whether these other transponder reading devices are in operation, or informs these other transponder reading devices when it itself assumes operation.

2. Control system according to claim 1, characterized in that each microcontroller has processing units, one processing unit processes the application program and at least one processing unit processes information exchanged inside the control network.

3. Control system according to claim 1 or 2, wherein the decentrally operating network has modular units, modular unit is provided at least at an intersection of transfer paths of the objects for the decentral control of the movement of the objects at the intersection.

4. Control system according to claim 3, wherein a device is provided between each modular unit and the rest of the network which device transmits information which is of interest only to other modular units or a network manager.

5. Control system according to claim 3 or 4, wherein each modular unit is provided at a transfer path intersection and includes at least one transponder reading device to recognize objects, at least one secondary control unit for a device to change the direction of movement of objects, and a main control unit linked to at least one transponder reading, unit and at least one secondary control unit to exchange information, which optimize transfer routes of objects via the intersection.

6. Control system according to claim 4, wherein a modular unit is provided for a transfer route intersection, and includes four tracks, each arranged in pairs for incoming and outgoing objects, and four devices to change the direction of movement of objects by rotating plates, wherein one rotating plate is provided for each track for incoming objects, and one rotating plate is provided for each track of outgoing objects of two adjacent pairs, a transponder reading device is provided for each track for incoming objects, a secondary control unit is provided for each rotating plate, and including a main control unit.

* * * * *